United States Patent [19]

Traise et al.

[11] 3,725,480

[45] Apr. 3, 1973

[54] ASHLESS OIL ADDITIVES

[75] Inventors: Thornton P. Traise, Chicago Heights; Roger W. Watson, Batavia, both of Ill.; Randel Q. Little, Munster, Ind.

[73] Assignee: Standard Oil Company, Chicago, Ill.

[22] Filed: Oct. 15, 1970

[21] Appl. No.: 81,190

Related U.S. Application Data

[62] Division of Ser. No. 774,497, Nov. 8, 1968, Pat. No. 3,591,598.

[52] U.S. Cl............260/583 P, 260/268 R, 260/51.5, 260/239 A, 260/309.7, 260/593 R, 260/601 R, 260/619 R, 260/624 R, 260/626 R, 260/626 T, 252/51.5 R

[51] Int. Cl..........C08g 9/04, C08g 9/26, C08g 9/34, C08g 37/24, C08g 37/18, C08g 37/36

[58] Field of Search ..260/296 R, 583 P, 51.5, 268 R; 252/51.5 R

[56] References Cited

UNITED STATES PATENTS

| | | | |
|---|---|---|---|
| 2,336,006 | 12/1943 | Fuller | 252/51.5 R |
| 2,511,063 | 6/1950 | Ingram | 252/51.5 R |
| 2,962,442 | 11/1960 | Andress | 252/51.5 R |
| 3,351,662 | 11/1967 | Chamot | 252/51.5 R |
| 3,368,972 | 2/1968 | Otto | 252/51.5 R |
| 3,413,347 | 11/1968 | Worrel | 260/583 P |
| 3,448,047 | 6/1969 | Traise et al. | 260/296 R |

*Primary Examiner*—Henry R. Jiles
*Assistant Examiner*—Robert T. Bond
*Attorney*—Arthur G. Gilkes, William T. McClain and John J. Connors

[57] ABSTRACT

This invention concerns the condensation product of an aldehyde reactant having more than one carbon atom and/or ketone reactant, formaldehyde, an alkylene polyamine, and an alkyl-substituted phenol. These compositions can be used as ashless alkaline additives for lubricating oils.

3 Claims, No Drawings

ASHLESS OIL ADDITIVES

RELATED APPLICATIONS

This application is a divisional of U.S. application Ser. No. 774,497, filed Nov. 8, 1968 now U.S. Pat. No. 3,591,598 and entitled ASHLESS OIL ADDITIVES.

BACKGROUND OF THE INVENTION

Known lubricating oils for engines develop acidic materials which react with the oil to form sludge and varnish that interfere with the operation of the engine. The addition of alkaline additives to oils neutralizes the acidic materials, rendering them harmless. Many conventional additives include metals, and these metal-containing additives make their way into the combustion chamber of the engine and are burned, leaving an ash which hampers the performance of the engine and which is occasionally blown from the exhaust as red-hot particles that can cause fires. Researchers, in attempting to find ashless additives which are soluble or miscible in lubricating oil and which themselves do not harm engine parts, have investigated low molecular weight Mannich compounds. However, at effective concentrations, many of these Mannich compounds are immiscible with or insoluble in lubricating oils.

SUMMARY OF THE INVENTION

We have discovered novel compositions which serve as highly active ashless alkaline additives for oil. These compositions, which are oil-soluble or oil-miscible, can be made by either of two methods. The first, and preferred, method calls for reacting an aldehyde reactant having more than one carbon atom, or a ketone reactant, or a mixture of said aldehyde and ketone reactants with the following Mannich condensation product: Mannich products formed by the condensation of an alkyl-substituted phenol, formaldehyde, and an alkylene polyamine. The second method calls for reacting an aldehyde reactant having more than one carbon atom, or a ketone reactant, or a mixture of said aldehyde and ketone reactants with an alkylene polyamine to form an intermediate, and then reacting the intermediate with formaldehyde and an alkyl-substituted phenol. The reactions are exothermic, but we usually heat the reaction mixture to a temperature between about 100° C and about 200° C, preferably between about 110° C and about 180° C. This additional heating drives the reactions to substantial completion and removes water of condensation from the product.

The above-mentioned Mannich condensation product is a strong anti-acid. But, if it has a low molecular weight, it is not readily soluble in oil. We have found that these low molecular weight Mannich condensation products react with aldehydes and ketones to produce excellent alkaline additives which are soluble or miscible in oil. Oils containing a minor amount of the alkaline additives of our invention, generally from about 5 to about 20 weight percent, do not deleteriously affect engines and, in fact, they have many advantages in use.

The reaction between the various starting materials is very complex and, therefore, we cannot demonstrate with certainty the precise formula of the alkaline additives of our invention. We do, however, know that the carbonyl group of the aldehyde reactant or ketone reactant is capable of reacting with one or more of the several different reactive amino groups available. The following equations show some of the possible reactions and illustrate said complexity:

(1) 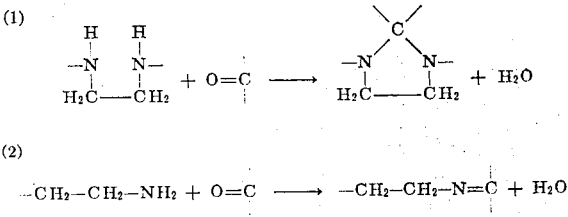

(2) 
$$-CH_2-CH_2-NH_2 + O=C \longrightarrow -CH_2-CH_2-N=C + H_2O$$

Equation (1) illustrates the reaction between the secondary amino group of the polyamine moiety and the carbonyl group of the aldehyde reactant or ketone reactant to form a cyclic group. Equation (2) illustrates the reaction between the primary amino group of the polyamine moiety and the carbonyl group of the aldehyde reactant or ketone reactant to form an imine group. Only one of these reactions may be dominating, but it is possible that all occur simultaneously and at about the same rate. Because of the availability of so many different reactive amino groups, the amount of aldehyde and/or ketone reactants used may vary greatly. The only criterion is that the aldehyde and/or ketone reactants be added until the condensation product is soluble in oil. In general, formaldehyde, polyamine, and the substituted phenol are reacted in the respective molar ratios of about 1–2:1–2:1. When the formaldehyde, polyamine, and phenol are reacted in these relative proportions, generally from 1–4 moles of aldehyde and/or ketone reactant is employed.

Preferably, the aldehyde and ketone reactants have at least six carbon atoms. The greater number of carbon atoms in the aldehyde and ketone reactants and the greater the branching of the hydrocarbon chain of these reactants, the more oil-soluble the condensation product. We especially prefer those aldehyde and ketone reactants having branched alkyl groups containing from six to 18 carbon atoms. Examples of suitable aldehyde reactants are: hexanal, heptanal, 2-methyl heptanal, 2-ethyl heptanal, 2-methyl-4-ethyl heptanal, 3-methyl decanal, 3,5-dimethyl decanal, 3-ethyl-5-methyl decanal, 5-butyl decanal, 5-methyl-6-butyl decanal, 5-methyl pentadecanal, 5-ethyl pentadecanal, and 3-methyl heptadecanal. Examples of suitable ketone reactants are: 2-hexanone, 3-heptanone, 3-octanone, 2-methyl-3-octanone, 2-ethyl-3-octanone, 5-methyl-3-decanone, 5-ethyl-3-decanone, 5-propyl-3-decanone, 5-propyl-3-undecanone, 5-penta-3-decanone, 2-methyl-5-pentadecanone, 2-ethyl-5-pentadecanone, and 2-propyl-5-pentadecanone.

The alkyl substituents of preferred alkyl-substituted phenols contain less than about 40 carbon atoms, and most preferably contain branched alkyl groups from about one to about 18 carbon atoms.

Suitable alkylene polyamines generally come within the following formula:

in which $n$ is an integer from about 1 to about 10, and "alkylene" is a saturated divalent hydrocarbon having from about two to about eight carbon atoms. The preferred alkylene polyamines are ethylene polyamines ("alkylene" having two carbon atoms) of which tetraethylene pentamine is the most preferred. Other alkylene polyamines include, for example, propylene polyamines, butylene polyamines, and cyclic homologues of such polyamines, for example piperazines. Specific examples of still other alkylene polyamines are: ethylene diamine, diethylene triamine, pentaethylene tetramine, and N-2-aminoethyl-piperazine.

PREPARATION OF MANNICH CONDENSATION PRODUCT

Mix 5 moles of p-nonylphenol and 10 moles of tetraethylene pentamine in a suitable flask fitted with stirring apparatus, reflux condenser, a Barrett trap, and a nitrogen inlet tube. Then, with stirring, slowly add to the flask over a period of about 2 hours 10 moles of formaldehyde dissolved in water (63 weight percent water). As formaldehyde is added, the temperature of the reaction mixture rises from ambient to about 70° C. When all the formaldehyde is added, stop stirring, inject nitrogen into the reaction mixture as an aid in removing water, and heat for several hours (about 36), gradually increasing temperature from 70° to 160° C to remove the water added with the formaldehyde and the water formed during the condensation reaction. The water collects in the Barrett trap. A Mannich condensation product so prepared has an average molecular weight of about 557.

DESCRIPTION OF THE PREFERRED EMBODIMENTS

EXAMPLE I

Dissolve 1.8 moles of Mannich product in 500 milliliters of isopropyl alcohol contained in a suitable flask fitted with a reflux condenser, stirring apparatus, a Barrett trap, and a nitrogen inlet tube. With stirring, slowly add to the flask over a period about 1 hour 3 moles of a mixture of branched chain aldehydes containing 10 carbon atoms (Enjay Chemical Co. MD-223). As this mixture of aldehydes is added, the temperature of the reaction will rise from ambient to about 55° C. When all the aldehyde is added, inject nitrogen into the reaction mixture, and heat the mixture for several hours (about 36), gradually increasing the temperature from 55° to 170° C to remove the alcohol and by-product water. An alkaline additive so prepared has a molecular weight of about 600, and is readily dispersed in SAE-5W oil. To make this additive even more oil-soluble, it is reacted with more aldehydes as described in Example II.

EXAMPLE II

In a suitable flask, mix 1.2 moles of the alkaline additive made in Example I with 700 grams of SAE-5W oil. Then, with stirring, slowly add to the mixture over a period of about 35 minutes 0.9 mole of the mixture of $C_{10}$ aldehydes. As the aldehyde is added, the temperature of the reaction mixture rises from ambient to about 36° C. Cover the mixture with nitrogen and heat at 150° C for about 2 hours, and then cool. The alkaline additive thus prepared is a bright amber oily material which is soluble in hot oil.

EXAMPLE III

Dissolve 1.8 moles of Mannich product in 500 grams of SAE-5W oil contained in a suitable flask fitted with the necessary stirring, reflux, and nitrogen feed equipment. Inject nitrogen into the flask and slowly, with stirring, add to the flask over a period of about 1 hour 4 moles of the mixture of $C_{10}$ aldehydes. Then heat for several hours while injecting nitrogen. An alkaline additive so prepared is soluble in hot oil.

EXAMPLE IV

In a suitable flask fitted with suitable equipment, mix 1 mole of Mannich product with 500 grams of SAE-5W oil, and then add 2 moles of hexanal and 2 moles of 2-methyl-3-octanone. Heat the reaction mixture for several hours and inject nitrogen to remove water. An alkaline additive so prepared is oil-soluble.

The above examples have been presented merely to illustrate the preferred embodiments of our invention. Those skilled in the art will immediately appreciate that these examples can be changed in many details. For example, other aldehydes, ketones, and Mannich products coming within the scope of our disclosure will react similarly to those illustrated in the examples.

We claim:

1. The reaction product of (a) formaldehye; (b) an alkylene polyamine having the formula: $H_2N(-$alkylene$-NH)_nH$ in which $n$ is an integer from 1 to 10 and "alkylene" has from two to eight carbon atoms; (c) an alkyl-substituted phenol wherein the alkyl group has less than 40 carbon atoms; and (d) an aldehyde reactant or a ketone reactant, or a mixture of said aldehyde reactant and ketone reactant, said adehyde reactant and/or ketone reactant having from six to 18 carbon atoms, said formaledhyde, polyamine and substituted phenol being reacted at a temperature of from about 100° C to about 200° C in the respective molar ratios of about 1-2:1-2:1, and said aldehyde reactant and/or ketone reactant being reacted in an amount sufficient to impart oil solubility to the product at a temperature of from about 100° C to about 200° C.

2. The condensation product defined in claim 1 wherein the formaldehyde, polyamine, substituted phenol and the aldehyde reactant and/or ketone reactant are reacted in the respective molar ratios of about 1-2:1—4.

3. The composition defined in claim 2 wherein the alkyl substituent of the alkyl-substituted phenol contains from one to 18 carbon atoms.

* * * * *